United States Patent
Liu

(10) Patent No.: US 7,077,557 B2
(45) Date of Patent: Jul. 18, 2006

(54) SURFACE LIGHT SOURCE DEVICE

(75) Inventor: Hong-Da Liu, Jubei (TW)

(73) Assignee: Wistron Optronics Corporation, Hsin-Chu (TW)

( * ) Notice: Subject to any disclaimer, the term of this patent is extended or adjusted under 35 U.S.C. 154(b) by 99 days.

(21) Appl. No.: 10/813,831

(22) Filed: Mar. 31, 2004

(65) Prior Publication Data
US 2005/0117369 A1   Jun. 2, 2005

(30) Foreign Application Priority Data
Dec. 2, 2003   (TW) .............................. 92133921 A

(51) Int. Cl.
*F21V 7/04* (2006.01)
*G09F 13/18* (2006.01)

(52) U.S. Cl. ...................... 362/629; 362/624; 362/558; 362/560; 40/546

(58) Field of Classification Search ........ 362/600–634, 362/558, 560, 582, 583; 40/546
See application file for complete search history.

(56) References Cited

U.S. PATENT DOCUMENTS

| | | | | |
|---|---|---|---|---|
| 4,811,507 A | * | 3/1989 | Blanchet | 40/546 |
| 5,099,343 A | * | 3/1992 | Margerum et al. | 349/63 |
| 5,613,751 A | * | 3/1997 | Parker et al. | 362/627 |
| 5,618,096 A | * | 4/1997 | Parker et al. | 362/629 |
| 5,899,552 A | * | 5/1999 | Yokoyama et al. | 362/619 |
| 6,079,838 A | * | 6/2000 | Parker et al. | 362/617 |
| 6,152,570 A | * | 11/2000 | Yokoyama | 362/613 |
| 6,301,418 B1 | * | 10/2001 | Freier et al. | 385/123 |
| 6,629,772 B1 | * | 10/2003 | Brunfeld | 362/582 |

* cited by examiner

Primary Examiner—Alan Cariaso
Assistant Examiner—James W Cranson, Jr.
(74) Attorney, Agent, or Firm—Thomas, Kayden, Horstemeyer & Risley

(57) ABSTRACT

A surface light source device. A light guide plate has an incident end face, an emitting face, at least one full-reflective face, and a plurality of light adjusters. The full-reflective face reflects light onto the incident end face for direction to the emitting face for transmission. The light adjusters are disposed in the light guide plate with a density discontinuously varied in at least one area of the light guide plate to adjust light collection for emission from the different areas of the emitting face, hereby providing discontinuous light intensity. The light source is disposed in the vicinity of the incident end face.

9 Claims, 6 Drawing Sheets

SURFACE LIGHT SOURCE DEVICE

BACKGROUND OF THE INVENTION

1. Field of the Invention

The present invention relates to a flat panel display, and in particular to a surface light source device thereof providing discontinuous light intensity distribution.

2. Description of the Related Art

Flat panel displays (FPD) are widely applied in the fields of information, communication, transportation, and consumptive electronic products due to their high resolution, light weight and compact size, low voltage and low power consumption. The related products are large-screen-sized high definition television sets (HDTV), wall-hung type television sets and projecting television sets, and projection television sets, notebook computers, PDA (personal digital assistant), GPS (global positioning system), electronic dictionaries, and the like.

When a liquid crystal display is used in low or dim light, internal illumination is usually provided by a surface light source of side light type fitted with a light guide plate. For example, a conventional surface light source device of side light type 1' covers a reflective liquid crystal panel 2', as disclosed in FIG. 1. FIG. 2 discloses a conventional surface light device of side light type 1' stacked in a transmissive liquid crystal panel 3'. The surface light source mainly comprises a light guide plate 11' and a light source 12'. The light source 12' is placed along an end surface 111' of the light guide plate 11'. As shown in FIG. 1, the reflective liquid crystal panel 2' comprises, from top to bottom, an upper polarized plate 21', an upper substrate 22', a liquid crystal cell 23', a reflective layer 24', and a lower substrate 25', and further the surface light source 1' covering the upper polarized plate 21'. As shown in FIG. 2, the transmissive liquid crystal panel 3' comprises, from top to bottom, an upper polarized plate 31', an upper substrate 32', a liquid crystal cell 33', a lower substrate 34', a lower polarized plate 35', a diffusion plate 36', the surface light source 1' device, and a reflective plate 37'.

Light emitted by the light source 12' enters the light guide plate 11' from the end surface 111' and undergoes total reflection inside the light guide plate 11', according to Snell's Law. The micro-prism 112' structure on the top of the light guide plate 11' reflects and directs the light to the emitting face 113' of the bottom of the light guide plate 11' for emission, such that light emitted therefrom exhibits a uniform brightness distribution in the total area. Then, as shown in FIGS. 1 and 2, the light is further collected uniformly into the desired display ranges of the liquid crystal panel 2' or 3' (reflective and transmissive types, respectively). In addition, light adjusters, such as micro-reflectors or diffusers, may be set in the light guide plate to improve uniformity of light intensity from the light guide plate. FIGS. 3 and 4 show a graph of distribution density of the light adjusters versus the distance between the light adjusters and the light source and a graph of the property of the light output from the light guide plate.

The improvement of light guide plate and surface light source device performance is mostly effected by the design of the liquid crystal panel working together. Especially, for liquid crystal panel development, early reflective and transmissive types have evolved into the transflective type, and, in turn, applications currently gradually developed in which pixels with different light transmittivities are set in different areas in the display range of the liquid crystal panel. For example, in a panel structure of a single liquid crystal layer with duplex image function, the liquid crystal panel has a transmissive area and a reflective area, in which a side image of the liquid crystal panel is formed by light transmitted from a surface light source through the transmissive area, and another side image formed by light from a surface light source reflected by the reflective area. However, surface light source devices equipped with conventional light guide plates purposely provide a surface light illumination of uniform brightness in all areas. When the surface light illumination of uniform brightness works together with liquid crystal panels having areas of different light transmitivity as mentioned above, brightness is not uniform in the display range of the liquid crystal panel.

SUMMARY OF THE INVENTION

Accordingly, an object of the invention is to provide a surface light source device providing light output with discontinuous light intensity distribution in at least one area.

To achieve the object, the surface light source device of the present invention comprises a light guide plate and a light source. The light guide plate has an incident end face, an emitting face, at least one full-reflective face, and a plurality of light adjusters. The full-reflective face completely reflects the light incident onto the incident end face for advancement to the emitting face and transmission through the light guide plate. The light adjusters are disposed in the light guide plate, in such a way that the light adjuster distribution density variation is not continuous in at least one area of the light guide plate, adjusting the fully reflected light collected after emission from the different areas of the emitting face to present a discontinuous light intensity. The light source is disposed in the vicinity of the incident end face of the light guide plate to provide light onto the incident end face of the light guide plate.

BRIEF DESCRIPTION OF THE DRAWINGS

The present invention can be more fully understood by reading the subsequent detailed description and examples with references made to the accompanying drawings, wherein.

A detailed description is given in the following embodiments with reference to the accompanying drawings.

DETAILED DESCRIPTION OF THE INVENTION

Figure 1:
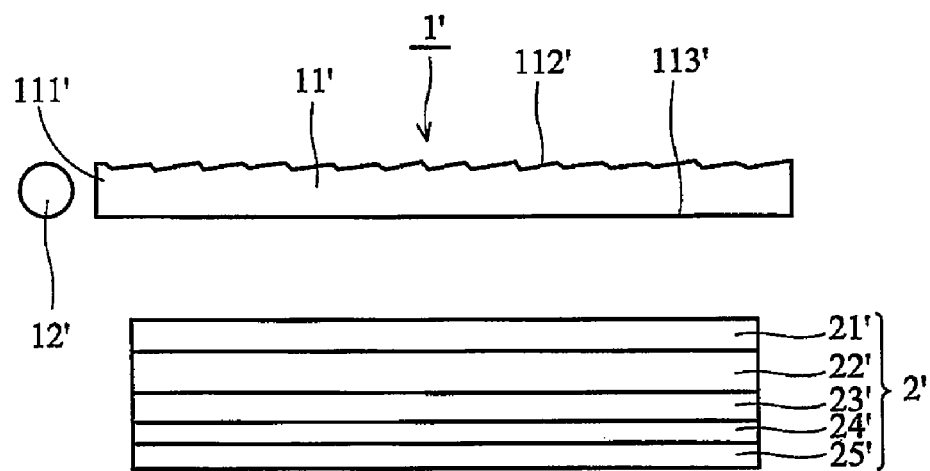
FIG. 1 is a schematic view of a conventional reflective display structure.
Figure 2:
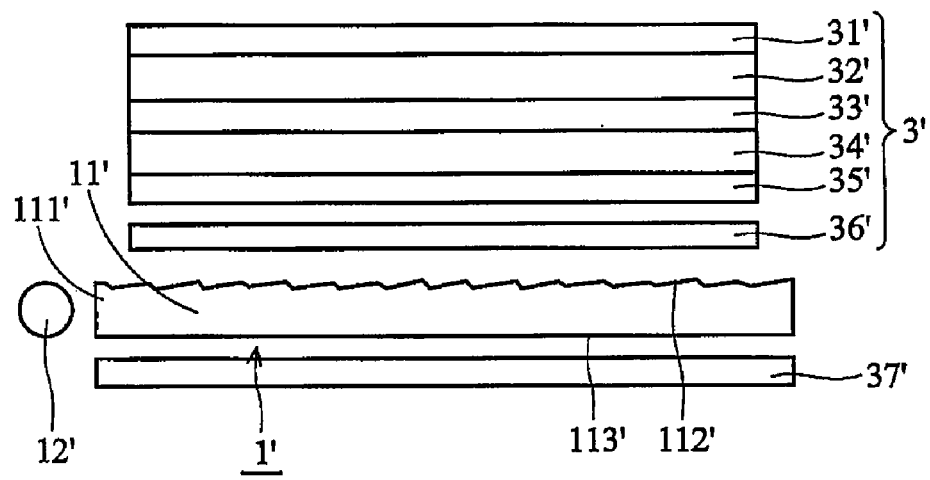
FIG. 2 is a schematic view of a conventional transmissive display structure.
Figure 3:
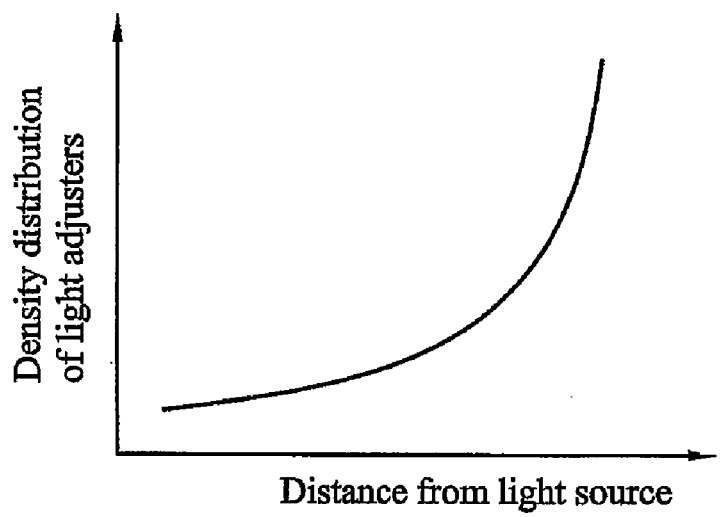
FIG. 3 is a graph of distribution density of the light adjusters versus the distance between the light adjusters and the light source in a conventional application.
Figure 4:
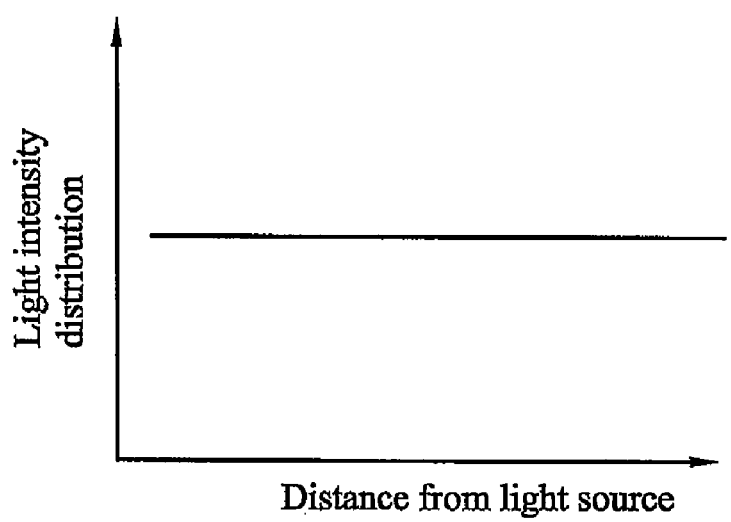
FIG. 4 is a graph of the properties of light output from the conventional light guide plate.
Figure 5:
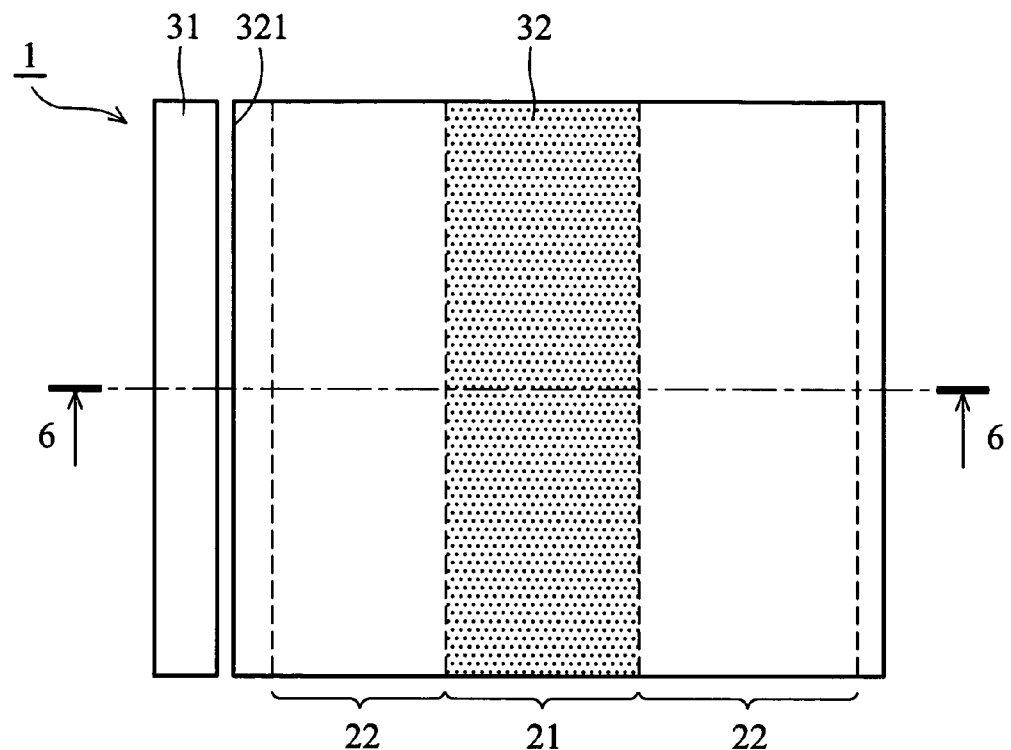
FIG. 5 is a schematic top view of the first embodiment of the present invention.
Figure 6:
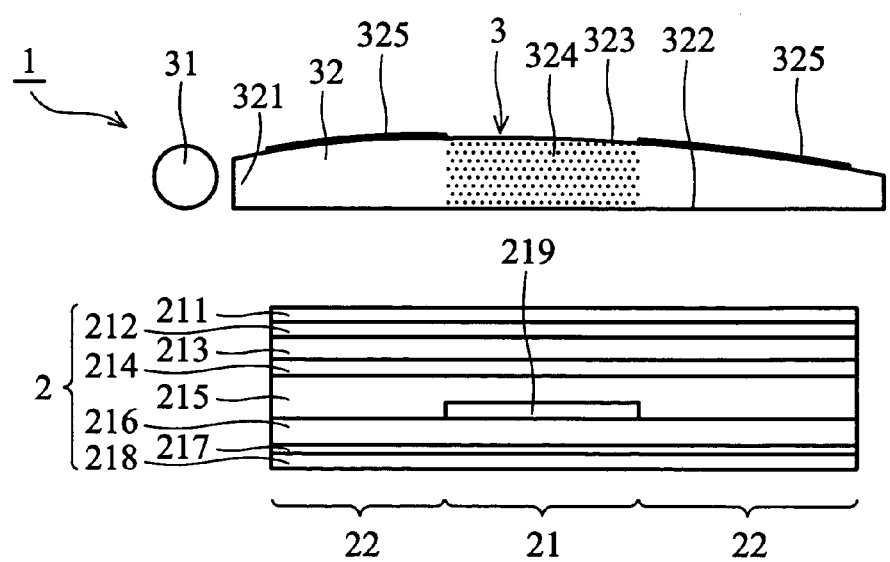
FIG. 6 is schematic cross section along line 6—6 shown in FIG. 5.
Figure 7:
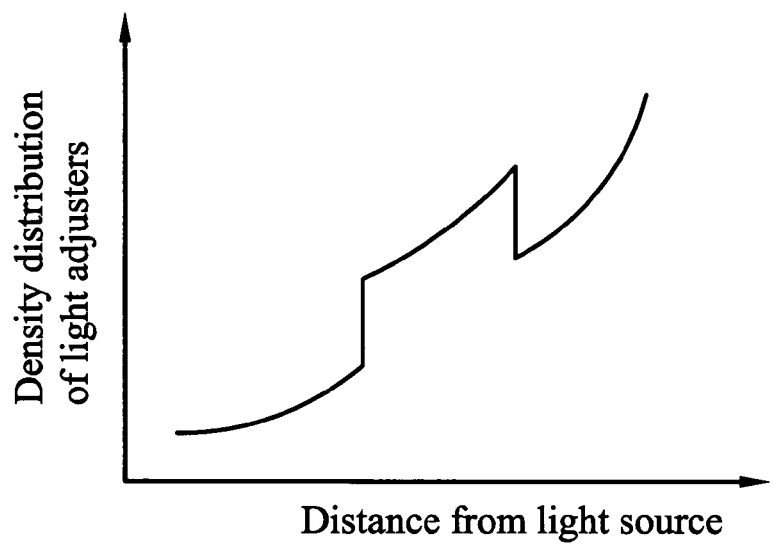
FIG. 7 is a graph of distribution density of the light adjusters along the line 6—6 shown in FIG. 5 versus the distance between the adjusters and the light source.

FIGS. 5 and 6 show the flat panel display 1 of the first preferred embodiment of the present invention, which mainly comprises a display panel 2 and a surface light source device 3.

The display panel 2 comprises a semi-transmissive area 21 and a transmissive area 22. The semi-transmissive area 21 is disposed in the central part of the display panel 2 with a rectangular shape. The transmissive area 22 is adjacent to the semi-transmissive area 21 and occupies the remainder of the display panel 2. Each of the areas 21 and 22 comprises, from top to bottom, an upper polarized plate 211, an upper phase shift sheet 212, an upper substrate 213, a filter 214, a liquid crystal cell 215, a lower substrate 216, a lower phase shift sheet 217, and a lower polarized plate 218. Furthermore, the semi-transmissive area 21 comprises a semi-reflective layer 219 between the liquid crystal cell 215 and the lower substrate 216, such that the transmitivity of the semi-transmissive area 21 is less than that of the transmissive area 22. Transmitivity for transmissive area 22 and semi-transmissive area 21 is generally about 70% and about 50%, respectively. For easier understanding, the sizes of the elements and the gaps in the Drawings are not to scale. The elements are adhered to each other by adhesive agents. In addition to the elements shown in the drawings, anti-glare film, spacer ball, liquid crystal driver IC, and driver circuit may be required in a flat panel display, but are not shown or described in detail for brevity.

The surface light source device 3 on the display panel 2 comprises a light source 31 and a light guide plate 32. The light source 31 may be an array of point light sources (such as light-emitting diodes), a linear light source converted from the point light sources, or a cold cathode fluorescence lamp (CCFL) of linear shape. The light guide plate 32 comprises light transmissive material, such as, for example, transparent resin, such as acrylic, polycarbonate or epoxy resin, quartz, or glass, transparent in the wavelength range of the light source. The light guide plate 32 has an incident end face 321, an emitting face 322, a full-reflective face 323, a plurality of light adjusters 324, and a reflective layer 325. To notably indicate the locally discontinuous density distribution state of those light adjusters, only the discontinuous density distribution area is shown and labeled in FIGS. 5 and 6, also true for subsequent embodiments. Light source 31 is disposed along the incident end face 321. The emitting face 322 is fixed to the display panel 2. The full-reflective faces opposite to the emitting face 322 reflect the incident light received by the incident end face 321 from the light source 31 and direct it to the emitting face 322 for emission from the light guide plate 32.

Figure 8:
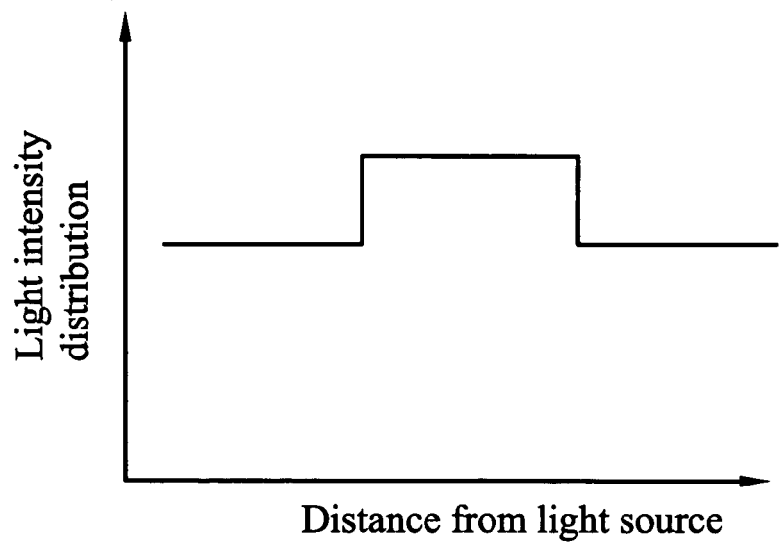
FIG. 8 is a graph of the properties of light output from the light guide plate of the first preferred embodiment.

Light adjusters 324 are disposed in the light guide plate 32 in the area formed by the projection of the semi-transmissive area 21 of the display panel 2, parallel to the normal direction of the emitting face 322 onto the light guide plate 32, with a discontinuous density distribution. Light adjustors may be micro-reflectors or diffusers. The reflective layer 325 is disposed on the full-reflective face 323 corresponding contrarily to the area formed by the projection of the light adjusters 324 parallel to the normal direction of the emitting face 322 onto the full-reflective face 323. The reflective layer 325 may comprises silver colored metal material, such as silver, aluminum, an alloy thereof or the like, or white non-metal material, such as magnesium oxide, titanium oxide and the like, in order to recover and maximize light otherwise scattered by the full-reflective face 323 due to refraction. Brightness of the transmissive area 22 of the display panel 2 is thus improved by collection of the light output from the light guide plate 32 onto the transmissive area 22, as shown in FIG. 8, such that total area brightness opposite to the surface light source device 3 in the flat panel display 1 is uniform.

In addition, assisting elements (not shown in the drawings) can be optionally disposed, as desired, in the surface light source device 3 to cover light source 31 and scatter the light in other directions of light source 31 onto the incident end face 321 of the light guide plate 32. Assisting elements generally comprises resin sheets coated with metal film having high reflectivity or metal foils.

Figure 9:
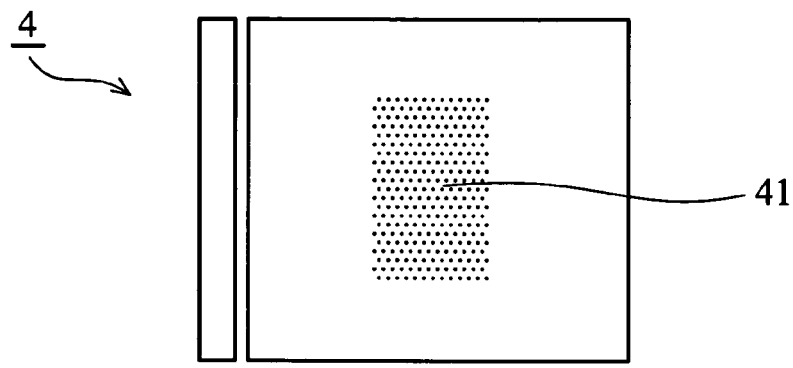
FIG. 9 is a schematic top view of the second embodiment of the present invention.
Figure 10:
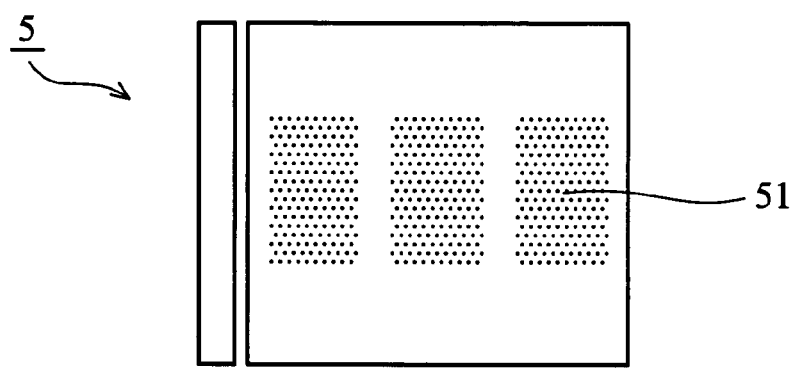
FIG. 10 is a schematic top view of the third embodiment of the present invention.
Figure 11:
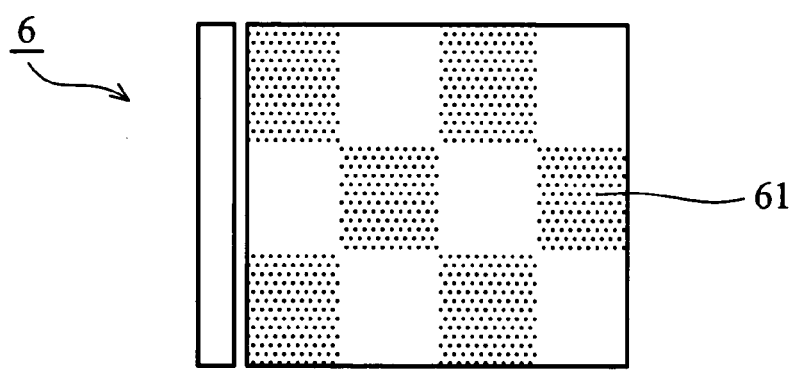
FIG. 11 is a schematic top view of the fourth embodiment of the present invention.

In the flat panel display described, the quantity and the distribution of the semi-transmissive area and the transmissive area can vary with the product design, for example, as indicated in FIGS. 9, 10, and 11, showing the surface light source device 4, 5, 6 of the second, third, and fourth preferred embodiments, respectively. The main difference is variation among the distribution regions of the light adjusters 41, 51, 61 in the surface light source devices 4, 5, and 6, respectively. In the second preferred embodiment, the light adjuster 41 is disposed corresponding to the semi-transmissive area, rectangular and located in the central part of the display panel (not shown in the drawings), so that the total area brightness of the bonding face of the display panel opposite to the surface light source device 4 is uniform as also mentioned in the previous embodiment. In the third preferred embodiment, the light adjuster 51 is disposed corresponding to the semi-transmissive area which comprises three rectangles side by side with interval in the central part of the display panel (not shown in the drawings) to exhibit the effect mentioned in the first embodiment. In the fourth embodiment, the light adjuster 61 is disposed corresponding to the semi-transmissive area which, together with the transmissive area of the display panel (not shown in the drawings), forms a grid pattern to exhibit the effect mentioned in the first embodiment.

Figure 12:
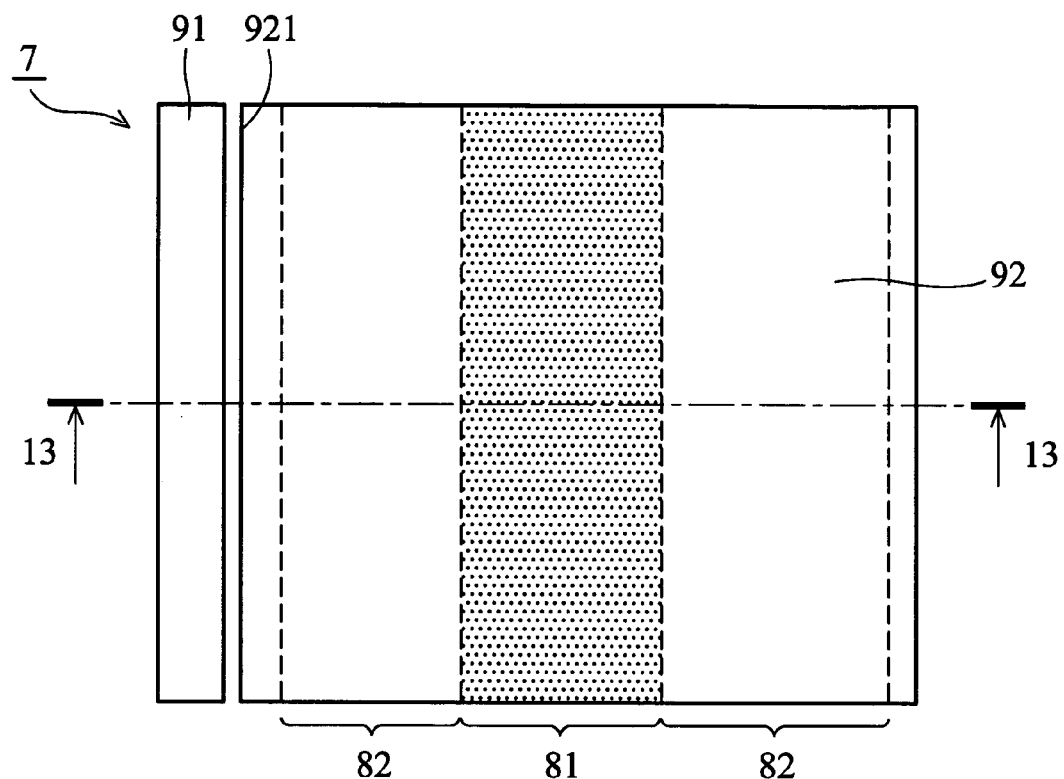
FIG. 12 is a schematic top view of the fifth embodiment of the present invention.
Figure 13:
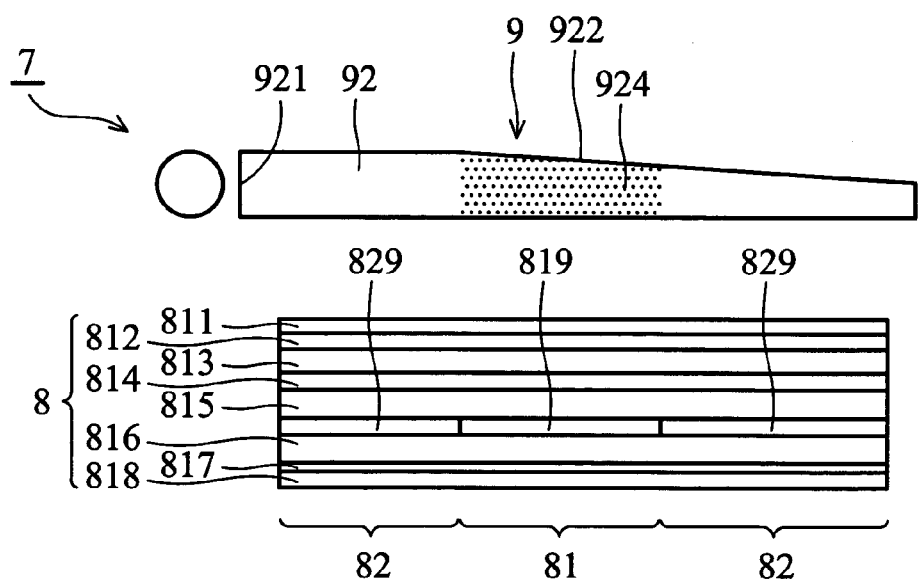
FIG. 13 is schematic cross section along line 13—13 shown in FIG. 12.

FIGS. 12 and 13 show the flat panel display 7 of the fifth preferred embodiment of the present invention. The structure of the flat panel display 7 is similar to the first embodiment for the reflective area 82 adjacent to the semi-transmissive area 81 occupying the remaining area of the display panel 8. Desired brightness of the semi-transmissive area 81 and the reflective area 82 receiving light from the surface light source device 9 can be easily attained by adjustment of the density of the light adjusters 924 disposed in the light guide plate 92, and furthermore, the total area brightness of the surface at the same side of the flat panel display 7 and the surface light source device 9 can be uniform. In this case, the semi-transmissive area 81 and the reflective area 82 each comprises, from top to bottom, an upper polarized plate 811, an upper phase shift sheet 812, an upper substrate 813, a filter 814, a liquid crystal cell 815, a lower substrate 816, a lower phase shift sheet 817, and a lower polarized plate 818. Furthermore, the semi-transmissive area 81 comprises a semi-reflective layer 819 between the liquid crystal cell 815 and the lower substrate 816 and the reflective area 82 comprises a reflective layer 829 between the liquid crystal cell 815 and the lower substrate 816. The light guide plate 92 comprises an incident end face 921, a full-reflective face 922, and a plurality of light adjusters 924.

It is to be noted that, as those skilled in the art may easily know, light intensity can be also adjusted by the disposition of a set of micro-prisms on the full-reflective surface of the light guide plate of the present invention to allow the surface light source device to provide locally discontinuous light intensity distribution, the distribution of the set of micro-prisms also having the same requirement as the light adjusters in the application corresponding to the panel displays of the embodiments. In other aspect, a surface light source device exhibiting a locally discontinuous light intensity distribution may also be obtained using electroluminescent (EL) material or organic light emitting diode (OLED) to form a face-shaped light emitting layer having the input voltage of each section individually controlled.

Summarily, in the present invention, different regions of light from the surface light source device provide discontinuous brightness attained by the light guide plate of the surface light source device having a plurality of light adjusters disposed therein in such a way that the density variation is not continuous in at least one area, thereby adjusting the light collection in the light guide plate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat panel display, comprising:
   a display panel comprising at least one semi-transmissive area and at least one transmissive area, the semi-transmissive area comprising one more semi-reflective layer than the transmissive area; and
   a surface light source device comprising a light guide plate and a light source, wherein the light guide plate comprising an incident end face, an emitting face, at least one full-reflective face, and a plurality of light adjusters,
   wherein the full-reflective face completely reflects the light incident onto the incident end face for direction to the emitting face and transmission through the light guide plate, and the light adjusters are disposed in the light guide plate at the location corresponding to the display areas of the display panel, with a density discontinuously varied in at least one area of the light guide plate to adjust the reflected light collection for emission from the different areas of the emitting face, such that brightness of one side field of view is uniform, and
   the light source is disposed in the vicinity of the incident end face of the light guide plate to provide light for onto the incident end face of the light guide plate.

2. The flat panel display as claimed in claim 1, wherein the light adjusters are micro-reflectors.

3. The flat panel display as claimed in claim 1, wherein the light adjusters are diffusers.

4. The flat panel display as claimed in claim 1, wherein the light adjusters are micro-prisms.

5. The flat panel display as claimed in claim 1, wherein a reflective layer is disposed on the full-reflective face correspondingly contrarily to the area formed by the projection of the light adjusters parallel to the normal direction of the emitting face onto the full-reflective face.

6. The flat panel display as claimed in claim 5, wherein the reflective layer comprises metal.

7. The flat panel display as claimed in claim 6, wherein the reflective layer comprises silver or aluminum.

8. The flat panel display as claimed in claim 5, wherein the reflective layer comprises white non-metallic material.

9. The flat panel display as claimed in claim 8, wherein the reflective layer comprises magnesium oxide or titanium oxide.

* * * * *